Dec. 15, 1942.    O. J. BRATZ    2,305,234
DETACHABLE STRAND CONNECTOR
Filed March 4, 1942
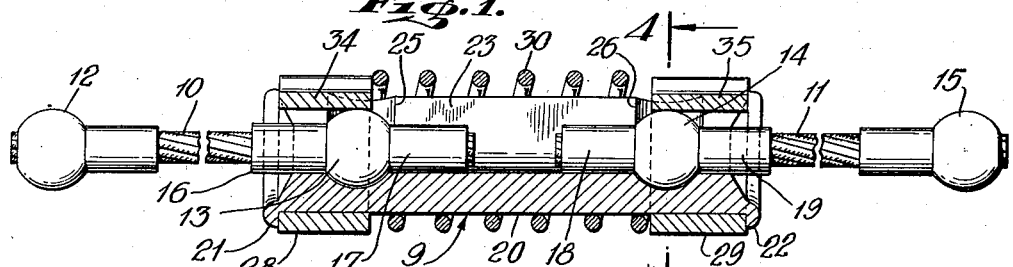
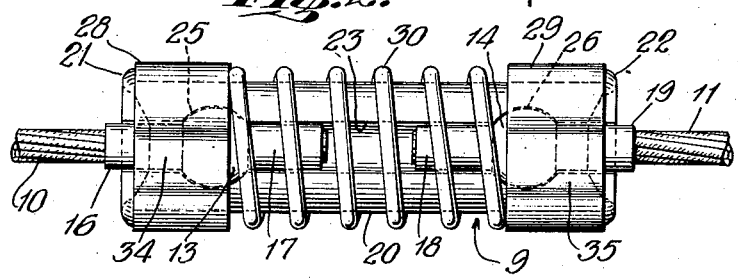
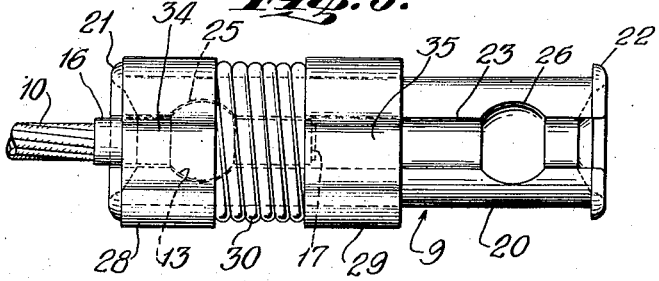
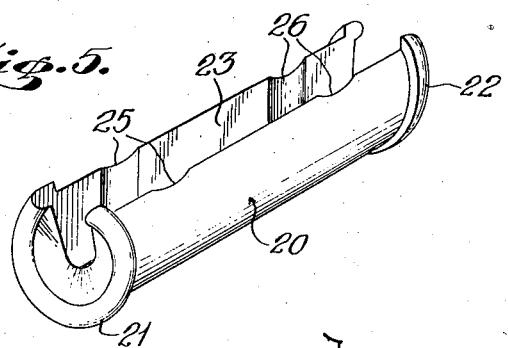
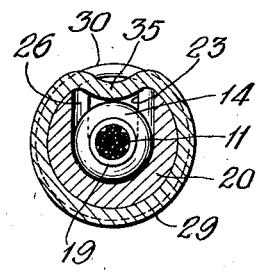
INVENTOR
OTTO J. BRATZ
BY
Frederick S. Duneau
ATTORNEY Patented Dec. 15, 1942

2,305,234

UNITED STATES PATENT OFFICE 2,305,234

DETACHABLE STRAND CONNECTOR

Otto J. Bratz, Adrian, Mich., assignor to American Chain & Cable Company, Inc., Bridgeport, Conn., a corporation of New York Application March 4, 1942, Serial No. 433,268

3 Claims. (Cl. 24—223)

This invention relates to a quickly detachable connector for connecting elements such as for example ropes, cables or strands equipped with enlargements on their ends.

Among the objects of this invention is the provision of an improved quickly detachable connector for connecting the ends of cables or the like equipped with end fittings; a connector which is strong and reliable in service, which is adapted to connect similar end fittings and which is equipped with improved means for retaining the end fittings in seated position within recesses in the connector.

Other objects of this invention will appear from the following description taken in connection with the drawing, in which—

Fig. 1 is a longitudinal sectional view through the connector, showing the same connecting two cables;

Fig. 2 is a top plan view as viewed looking downward in Fig. 1 with the parts in connecting position;

Fig. 3 is a view similar to Fig. 2 showing one of the connector retaining means moved out of functioning position;

Fig. 4 is a cross section on the line 4—4 of Fig. 1; and

Fig. 5 is a perspective view of the body of the connector.

The connector, indicated generally at 9, constitutes an embodiment of my invention designed for use in connecting cables 10 and 11 equipped with ball end fittings 12 and 13, and 14 and 15, respectively. It is obvious of course that the fittings 12 and 15 may be of different type from that disclosed or may be omitted and the cables 10 and 11 anchored to supports in any suitable manner. As disclosed the ball ends 13 and 14 may be provided with cylindrical extensions 16 and 17, and 18 and 19, respectively.

The detachable connector 9 includes a body portion 20 Fig. 5 which is generally cylindrical in form and is provided with peripheral end flanges 21 and 22 and with a radial longitudinally extending groove 23 of substantially the same width as the cylindrical extension 16, 17, 18 and 19, and extended diametrically to such depth that the axes of the fittings on the ends of the cables will be coincident with the axis of the body portion 20. The groove 23 is enlarged and made deeper near its ends as indicated at 25 and 26 in order that the ball end fittings 13 and 14 may be inserted laterally into the groove in the connector and the cylindrical extensions 16, 17, 18 and 19 seated on the bottom of the groove.

The fittings may be held in seated position in the groove in the connector by means of two identical collars 28 and 29 which are urged against the flanges 21 and 22 on the ends of the body portion of the connector by a spring 30. These collars are provided with inwardly bent or reentrant portions 34 and 35 which extend into the groove 23 and bear upon the ball ends 13 and 14 when they are spring pressed into engagement with the flanges 21 and 22 as appears more clearly in Fig. 1.

The body portion 20 may be formed in any suitable manner and preferably is formed from a cylindrical rod, the ends of which may be drilled to a shallow depth providing flanges or cylindrical extensions on the ends of the rod which may be spun outwardly to form the flanges 21 and 22. The rod may be machined to provide the groove 23 and then the grooves 25 and 26 may be provided by radial drilling. The collars are formed and provided with the reentrant portions 34 and 35 preferably before assembly. The collars and spring are assembled on the rod and then the flanges 21 and 22 are formed on the body 20 by spinning.

If desired the parts may be proportioned so that there will be no substantial pivotal movement between the ball ends and the connector. The ball ends 13 and 14 may be inserted and removed from the connector after compressing the spring 30 as shown in Fig. 3. By providing the ball ends 13 and 14 with the sleeve extensions 17 and 18, the spring 30 must be compressed to the extent indicated in Fig. 3 to permit the insertion or removal of the ball end fittings such as 14, with the result that the connection will not likely become detached accidentally.

While the invention has been described with particularity as to the preferred form disclosed, it is understood that applicant reserves the right to all such changes and constructions as fall within the principles of the invention and the scope of the appended claims.

I claim:

1. A detachable connector comprising a cylindrical member provided with a longitudinally extending radial groove and radially extending grooves in the walls of said first mentioned groove near the ends of the body of the connector, peripheral shoulders on the ends of the body, collars surrounding said body and a spring urging said collars in opposite directions against said shoulders.

2. A detachable connector comprising a cylindrical member provided with a longitudinally extending radial groove and radially extending grooves in the walls of said first mentioned groove near the ends of the body of the connector, peripheral shoulders on the ends of the body, collars surrounding said body and a spring urging said collars in opposite directions against said shoulders, said collars being provided with reentrant portions extending into the first mentioned groove in said body substantially into contact with fittings received in said second mentioned grooves.

3. A detachable connector comprising an elongated member provided with a longitudinally extending groove extending through at least one of the ends of the connector and enlarged near said end for the reception of an end fitting, a peripheral shoulder on said end of said member, a retaining ring on said member adapted when in engagement with said shoulder to engage and retain said fitting in said connector, a spring urging said ring into retaining position and an abutment on said member for said spring.

OTTO J. BRATZ.